(12) United States Patent
Gaudet et al.

(10) Patent No.: US 9,525,692 B2
(45) Date of Patent: Dec. 20, 2016

(54) SECURE CONTENT SHARING

(71) Applicants: Edward J. Gaudet, Hanover, MA (US); John Gage, Norfolk, MA (US); David Kashtan, Santa Cruz, CA (US); Jason Mafera, Francestown, NH (US); Eliot Rubinov, Palo Alto, CA (US); Kuntal Sengupta, Winchester, MA (US); David M. T. Ting, Sudbury, MA (US); Kyle Vernest, Boston, MA (US); Bryan Galloway, Lexington, MA (US); Mae-Ellen Gavin, Lexington, MA (US)

(72) Inventors: Edward J. Gaudet, Hanover, MA (US); John Gage, Norfolk, MA (US); David Kashtan, Santa Cruz, CA (US); Jason Mafera, Francestown, NH (US); Eliot Rubinov, Palo Alto, CA (US); Kuntal Sengupta, Winchester, MA (US); David M. T. Ting, Sudbury, MA (US); Kyle Vernest, Boston, MA (US); Bryan Galloway, Lexington, MA (US); Mae-Ellen Gavin, Lexington, MA (US)

(73) Assignee: IMPRIVATA, INC., Lexington, MA (US)

( * ) Notice: Subject to any disclaimer, the term of this patent is extended or adjusted under 35 U.S.C. 154(b) by 206 days.

(21) Appl. No.: 14/063,839

(22) Filed: Oct. 25, 2013

(65) Prior Publication Data

US 2014/0123237 A1    May 1, 2014

Related U.S. Application Data

(60) Provisional application No. 61/718,326, filed on Oct. 25, 2012, provisional application No. 61/781,846, filed on Mar. 14, 2013.

(51) Int. Cl.
*H04L 29/06* (2006.01)
*G06F 21/62* (2013.01)
(Continued)

(52) U.S. Cl.
CPC ......... *H04L 63/101* (2013.01); *G06F 21/6245* (2013.01); *H04L 63/08* (2013.01);
(Continued)

(58) Field of Classification Search
None
See application file for complete search history.

(56) References Cited

U.S. PATENT DOCUMENTS 5,924,074 A    7/1999    Evans
6,826,696 B1    11/2004    Chawla et al.
(Continued)

FOREIGN PATENT DOCUMENTS

EP    1259879 A2    11/2002
EP    1788502 A1    5/2007
(Continued)

OTHER PUBLICATIONS

He, Daisy Daiqin, et al., "Authorization Control in Collaborative Healthcare Systems", J. Theor. Appl. Electron. Commer. Res. v.4 n.2 Talca ago. (2009), available online at http://www.scielo.cl/scielo.php?pid=S0718-18762009000200008&script=sci_arttext (last accessed on Nov. 13, 2013).
(Continued)

*Primary Examiner* — Hadi Armouche
*Assistant Examiner* — Andrew Steinle
(74) *Attorney, Agent, or Firm* — Morgan, Lewis & Bockius LLP

(57) ABSTRACT

Convenient sharing of information among authorized network users may be facilitated by allowing a user to send information originating from multiple applications in aggre-
(Continued)

gate form to another user, e.g., using a secure messaging service. In scenarios where data access is restricted, a server may check the recipient's access privileges prior to forwarding the information to her.

29 Claims, 4 Drawing Sheets

(51) Int. Cl.
*G06F 21/41* (2013.01)
*G06F 21/30* (2013.01)
*G06F 21/44* (2013.01)

(52) U.S. Cl.
CPC .............. *G06F 21/30* (2013.01); *G06F 21/41* (2013.01); *G06F 21/445* (2013.01)

(56) References Cited

U.S. PATENT DOCUMENTS

| | | |
|---|---|---|
| 7,298,836 B2 | 11/2007 | Wellons et al. |
| 7,587,368 B2 | 9/2009 | Felsher |
| 7,685,005 B2 | 3/2010 | Riff et al. |
| 7,849,498 B2 | 12/2010 | Royer et al. |
| 7,971,246 B1* | 6/2011 | Emigh et al. .................. 726/22 |
| 8,296,333 B2 | 10/2012 | Bessette |
| 2002/0010679 A1* | 1/2002 | Felsher ........................... 705/51 |
| 2006/0229911 A1 | 10/2006 | Gropper et al. |
| 2006/0235716 A1 | 10/2006 | Mahesh et al. |
| 2010/0298662 A1* | 11/2010 | Yu et al. ........................ 600/301 |
| 2010/0325427 A1* | 12/2010 | Ekberg et al. ................ 713/156 |
| 2011/0099027 A1 | 4/2011 | Weathers |
| 2011/0145018 A1 | 6/2011 | Fotsch et al. |
| 2011/0257998 A1* | 10/2011 | Cinqualbre et al. .............. 705/3 |
| 2012/0102560 A1 | 4/2012 | Arms et al. |
| 2012/0151210 A1 | 6/2012 | Perez |
| 2012/0215560 A1 | 8/2012 | Ofek et al. |
| 2012/0278093 A1 | 11/2012 | Amundson |
| 2013/0091549 A1* | 4/2013 | Joyce et al. ....................... 726/4 |
| 2013/0282903 A1* | 10/2013 | DeLuca ........................ 709/225 |
| 2014/0007180 A1* | 1/2014 | Agrawal ............... G06F 21/60 726/1 |

FOREIGN PATENT DOCUMENTS

| | | |
|---|---|---|
| EP | 2091410 A2 | 8/2009 |
| EP | 2219127 A1 | 8/2010 |
| EP | 2273400 A1 | 1/2011 |
| WO | WO-0116723 A2 | 3/2001 |
| WO | WO-2008057952 A2 | 5/2008 |

OTHER PUBLICATIONS

Singh, Jatinder, et al., "Policy-based Information Sharing in Publish/Subscribe Middleware", IEEE Workshop on Policies for Distribued Systems and Networks (2008), available online at http://www.cl.cam.ac.uk/research/srg/opera/publications/papers/paper-main.pdf. (last accessed on Nov. 13, 2013).

* cited by examiner

SECURE CONTENT SHARING

CROSS-REFERENCE TO RELATED APPLICATION

This application claims priority to and the benefits of, and incorporates herein by reference in their entireties, U.S. Provisional Application Nos. 61/718,326 and 61/781,846, filed on Oct. 25, 2012 and on Mar. 14, 2013, respectively.

TECHNICAL FIELD

The invention relates generally to systems and methods for secure, remote sharing and integrating of information. Various embodiments pertain, in particular, to the sharing of aggregate information from multiple data sources among authorized collaborators in a network-managed user group in scenarios where data access is restricted.

BACKGROUND

As computer systems become ubiquitous in both the home and industry, the ability for any one individual to access applications and data has increased dramatically. While such ease of access has streamlined many tasks such as paying bills, ordering supplies, and searching for information, it entails a the risk of providing the wrong data or functionality to the wrong person, which can be fatal to an organization. Instances of data breaches at many consumer-product companies and the need to comply with certain statutory measures (e.g., Health Insurance Portability and Accountability Act (HIPAA), Child Online Protection Act (COPA), Sarbanes-Oxley (SOX), etc.) have forced many companies and institutions to implement much stricter system access policies. Healthcare regulations, for example, mandate that "protected health information" (PHI) be accessible only by an authorized caregiver. Proper user authentication is required to access and alter PHI; this not only ensures patient privacy and safety, but also permits changes made to patient records to be audited later. Access restrictions are generally implemented, following user log-in to the system, by controlling access to applications with access to PHI.

A persistent problem with data management in a healthcare environment is the disparate nature of patient information, which can originate with any of various applications. Clinical decision making may require access to patient data from different sources—patient records from the hospital's main server, radiological information or lab results from other servers or an outside providers, prescription information from a pharmacopoeia, drug interactions from a specialized external resource—each of which may require a separate log-in. This inconvenience can be managed in the first instance using a "single sign-on" system, but sharing diversely sourced information remains cumbersome. A clinician who has retrieved various types of clinical data and wishes to consult remotely with a colleague or specialist has no easy way to provide this information directly. Even if the other clinician has already authenticated herself to the same applications as the referring clinician, she must typically retrieve each type of information separately. There is, at present, no easy way for an authorized user to efficiently generate and send disparately sourced information to another authorized user.

SUMMARY

Embodiments of the present invention facilitate convenient and secure sharing of information among authorized network users in scenarios where data access is restricted. In some embodiments, an authorized user accessing multiple software applications at one workstation may send that information, or a user-selected portion thereof, in aggregate form to another authorized user at a another workstation or mobile phone, using, e.g., a secure messaging service (e.g., a texting service enhanced with image, audio, and video support). For example, at the sender's workstation, a screen-sharing service may generate a replica of the display contents, optionally including the sender's annotations, which may then be transmitted to the selected recipient's device in the form of an image file or video stream (e.g., as an attachment to a text message) and/or blended into the aggregate form as an editable overlay. Similarly, a virtual-printing service may transmit a replica of documents opened in applications on the sender's workstation to the recipient, either separately for each application or, preferably, within a single message. Data from one or more applications may, alternatively, be exported using an application programming interface (API) or an open network protocol, facilitating a broader range of content formats for the data to be shared. In some embodiments, e.g., in a healthcare context, a "case builder" application allows the workstation user to integrate, organize, and annotate content from disparate sources into one multi-media file.

To implement any applicable data-access restrictions, the contents transmitted between users may include metadata (e.g., in the form of headers within image files, or as separate files) that identify the sending user, the application from which the information originates, and/or other relevant information (e.g., in a medical context, the patient to which the information pertains). The message containing the screen/document replica or exported-data file may be transmitted via a secure messaging server that, prior to forwarding the message, checks the recipient's authorization to access all of its contents; the messaging server may, for instance, consult a database storing, for each authorized system user, the applications and type of information (e.g., organized by patients) which that user is permitted to access. The messaging server may also excise any portions that the recipient is not permitted to see. In some embodiments, the replica or exported file is stored in a central repository, and the recipient of the information is provided with a link thereto; again, the recipient's authorization may be checked prior to facilitating access to the stored data. The metadata associated with the transmitted contents may also be used by the recipient to verify the authenticity and integrity of the received information as well as the audit history of modifications or annotations made to the content. As used herein, the term "metadata" broadly connotes any identifying information associated with the image, text, audio, or other content files shared, regardless of the manner in which this identifying information is formatted, stored, and linked to the content files.

In various embodiments, the functionality described above is implemented in a server-centric network architecture that includes authentication, desktop/application-hosting, and secure messaging servers in communication with workstations, mobile devices, or other client devices. Via terminal-emulation services executing on the client devices, users may access and interact with applications remotely running on the hosting server. Communications between users may be facilitated by the messaging server. Authentication prior to allowing access to the hosted applications and/or sharing of accessed content with other network users may be handled by the authentication server. As used herein, the term "server" generally refers to hardware and/or software providing a particular server functionality, irrespective of how this functionality is distributed. Thus, a "server" for a particular functionality may, in fact, include multiple intercommunicating computers and, conversely, a single computer may provide different server functionalities. For example, different applications may be provided on different hosting servers, or the applications running on the hosting server may pull in data from a separate central data repository. Application data may also be pulled from cloud-based content servers and mobile devices directly into a client device. Further, authentication and message-management functionality may be integrated on one server, or distributed between two or more servers in various ways.

In one aspect, embodiments of the invention provide a method for sharing accessed content between authorized users within a network-managed user group. The method involves, at a first user device, authenticating a first user via communication with an authentication server and providing access to multiple software applications. The first user, using the first user device, then selects a second user within the user group as well as contents from the multiple accessed software applications for transmission to the second user. The selected contents are exported (e.g., by converting at least a portion of the screen display into an image file, virtually printing the contents of selected ones of the applications, or using an application programming interface associated with one of the software applications) and transmitted to a server. The exported contents may be displayable or, in some embodiments, at least a part thereof may be in a format unsuitable for display. They may be static or dynamic, and may, in various embodiments, include a selectable web link, an image sequence displayable as video, and/or audio content. In some embodiments, the exported contents are integrated into a multi-media case file and/or annotated prior to transmission to the server.

At the server, it is determined whether the second user (i) has access privileges permitting access to at least a portion of the selected contents and (ii) has been authenticated by the authentication server via a second user device, and if so, transmission of only the portion to which the second user has access privileges to the second user device occurs. If the second user has not been authenticated by the authentication server via the second user device, the method may include facilitating authentication of the second user to the authentication server, and upon successful authentication, causing transmission to the second user device of the portion to which the second user has access privileges. In some embodiments, the method further involves redacting the exported contents by excising therefrom, by the server, portions to which the second user does not have access privileges, and thereafter causing transmission of the redacted exported contents.

Contents from the multiple accessed software applications may be selected (for transmission to the second user) by selecting display contents comprising multiple display portions containing data from different ones of the accessed software applications, or by selecting, among the accessed software applications, applications for transmission of their contents. Transmission of the exported contents (or portions thereof to which the second user has access privileges) may involve sending a message containing these contents or portions to the second user device. Alternatively, the contents (or portions thereof) may be stored in a central repository, and a link to the stored contents or content portions may be transmitted to the second user device; upon execution of the link, the stored contents or content portions may be transmitted to the second user device. In some embodiments, a digital signature identifying the first user may be associated with the contents prior to transmission thereto to the second user device, and upon transmission of the contents to the second device, the digital signature may be verified.

Metadata may be associated with exported contents. The metadata may identify the first user, the software applications from which the contents are selected, and/or a subject to which the contents pertain. For example, the software applications may provide access to electronic medical records, and the subject to which the contents pertain may include a patient identifier. The determination whether the second user has access privileges permitting access to at least a portion of the selected contents may be based at least in part on the metadata, and may involve consulting a database of user access privileges.

In some embodiments, the software applications are executed on a remote hosting server, and access to the software applications is provided by executing, on the first user device, a terminal emulator service displaying output from the software applications received via a network connection with the hosting server. Alternatively, access may be provided by executing one or more of the applications directly on the first user device. The first and second users may be authenticated via authentication devices associated with the first and second user devices. The authentication devices may obtain data from the first and second users, and to authenticate the first and second users, this data may be transmitted to an authentication server and compared at the authentication server to stored data for each of the first and second users. Upon detection of a match between the stored data and the data transmitted from the first user device and received at the server, the first or second user, respectively, is declared authenticated.

Another aspect of the invention relates to a client device providing access to multiple software applications and facilitating sharing of contents thereof with authorized users within a network-managed user group. In various embodiments, the client device includes at least a network interface, a processor, and memory storing processor-executable instructions comprising a user-authentication service, a secure messaging service, access means providing access to multiple software applications, and export means for exporting selected contents from the software applications and associating metadata therewith. The user-authentication service, when executed by the processor, establishes communications with an authentication server via the network interface to authenticate the user of the client device. The access means may be or include the software applications themselves, and/or a terminal emulation service, connected via the network interface to a remote hosting server executing the software applications. When executed by the processor, the server causes display of output from the remotely executed applications on the client device. The export means are response to selection, by the user, of contents from the software applications, and may be or include a screen sharing service and/or a virtual printing service. The secure messaging service is responsive to designation, by the user, of a recipient user, and, when executed by the processor, transmits the exported contents and associated metadata to a server for (i) determination, based at least in part on the metadata, whether the designated recipient user has access privileges permitting access to at least a portion of the exported contents and (ii) transmission of only those portions to which the recipient user has access privileges to a recipient client device used by the recipient user. The metadata may identify the first user, the software applications from which the contents are selected, and/or a subject to which the contents pertain.

The processor-executable instructions may further include a case builder application facilitating integration of content from multiple sources into a single case file; an auto-connection service which, when executed by the processor, automatically connects the client device to a mobile device belonging to the user authenticated at the client device; and/or an auto-binding service which, when executed by the processor and following connection of the client device to the mobile device, sends an identifier associated with the case file to the mobile device and causes the mobile device to tag data transmitted therefrom to the client device with the identifier. The client device may also include an authentication device, and authentication of the user may be based, at least in part, on data obtained by the authentication device.

Another aspect is directed to a server facilitating sharing of contents among authorized users within a network-managed user group. In various embodiments, the server includes a network interface for communicating with user devices, a processor, and memory storing processor-executable instructions. The instructions, when executed by the processor and in response to receipt, from a first user device, of contents originating from multiple applications accessed thereat and a designation of a user to receive the contents, cause the processor to (a) determine whether the designated user has access privileges permitting access to at least a portion of the contents and has been authenticated via a second user device, and (b) if so, cause transmission of only the portion to which the designated user has access privileges to the second user device. The server may further include a database of access privileges, and the processor-executable instructions may cause the processor to consult a database of access privileges to determine whether the designated user has access privileges permitting access to at least a portion of the contents. In addition, the server may also include a central data repository for storing the received contents. The contents may be static or dynamic, and may include, in various embodiments, a selectable web link, an image sequence displayable as video, or audio content.

The instructions may cause the processor to send a link to the stored contents to the first user device for transmission to the second user device and, in response to execution of the link at the second user device, transmit thereto the portion of the contents to which the designated user has access privileges. In some embodiments, the memory also stores instructions causing the processor, if the designated user has access privileges permitting access to only a portion of the contents, to redact the contents by excising therefrom portions to which the second user does not have access privileges. Further, the instructions may cause the processor to digitally sign the portion prior to transmission to the second user device.

In yet another aspect, the invention relates to a method for integrating data from a mobile device connected to a workstation with data from one or more applications accessed at the workstation. In various embodiments, the method includes logging a user onto the workstation. In response to logon of the user, an auto-connection service executed on the workstation obtains the identity of a mobile device belonging to the user and automatically connects the workstation to the identified mobile device. The method further includes accessing one or more applications at the workstation and exporting contents from the application(s) to a case file maintained on the workstation. An auto-binding service executed on the workstation transmits an identifier associated with the case file to the mobile device, and the mobile device thereafter transmits data tagged with the identifier to the workstation. Data transmitted from the mobile device is integrated into the case file.

A further aspect of the invention is directed to a workstation facilitating integration of data received from a mobile device connected thereto with data from one or more applications accessed at workstation. In various embodiments, the workstation includes a network interface, a processor, and memory storing (i) a case file, and (ii) processor-executable instructions including a user-authentication service, an auto-connection service, means for accessing one or more applications at the workstation (e.g., a terminal emulation service, or the applications themselves), an auto-binging service, and a case builder. The user-authentication service, when executed by the processor, manages user authentication and logon to the workstation. The auto-connection service, when executed by the processor and in response to logon of the user, obtains the identity of a mobile device belonging to the user and automatically connects the workstation to the identified mobile device. The auto-binding service, when executed by the processor and following connection of the workstation to the mobile device, sends an identifier associated with the case file to the mobile device and causes the mobile device to tag data transmitted therefrom to the workstation with the identifier. The case builder integrates content exported from the application(s) and tagged data received from the mobile device into the case file.

BRIEF DESCRIPTION OF THE DRAWINGS

The foregoing will more readily understood from the following detailed description of the invention, in particular, when taken in conjunction with the drawings, in which.

DETAILED DESCRIPTION

Embodiments of the present invention facilitate secure sharing of information among authorized collaborators within a network-managed user group. This capability may be integrated into a broadly functional end-to-end system in which information sharing represents one of several forms of service furthering interactive communications among network users. The range of capabilities such a system may offer is readily appreciated in a healthcare environment. Accordingly, the ensuing discussion elaborates on representative embodiments, for illustration purposes, with reference to a hospital or other healthcare context. It should be understood, however, that the systems and methods described herein are broadly applicable to, and advantageous in, any network environment where the members of an authorized user group desire to share data in a secure manner, e.g., in accordance with access restrictions imposed on the individual user group members.

Networks in accordance herewith generally include one or more servers as well as a plurality of client devices, including workstations and/or mobile devices. The workstations may be or include traditional personal computers (PCs) and/or "thin client" devices (including "ultrathin" or "zero" client devices) as are frequently employed in "mission-critical" environments such as healthcare. Thin client devices generally provide only basic presentation (display), networking, and device-redirection services (to support, for example, keyboard, mouse, audio, and USB devices) for server-based computing—i.e., architectures in which a sophisticated remote server supplies applications or even entire desktops to the thin client. The user interacts with the server-provided functionality via "receiver" or "terminal-emulation" software (or firmware) running on the thin client, ideally rendering the experience indistinguishable from using local applications running on a conventional PC. The thin clients may communicate with the application/desktop-hosting server, e.g., via a local-area network (LAN), wireless local-area network (WLAN), wide-area network (WAN), or the Internet, using network protocols such as RDP (Remote Desktop Protocol), ICA (Independent Computing Architecture), or PCoIP (PC over IP). The use of thin client devices may serve to eliminate data at the edge of a computer network where it is vulnerable to compromise; to centralize the management of computing resources on highly available hardware; and to simplify management and support of the endpoint devices.

Figure 1:
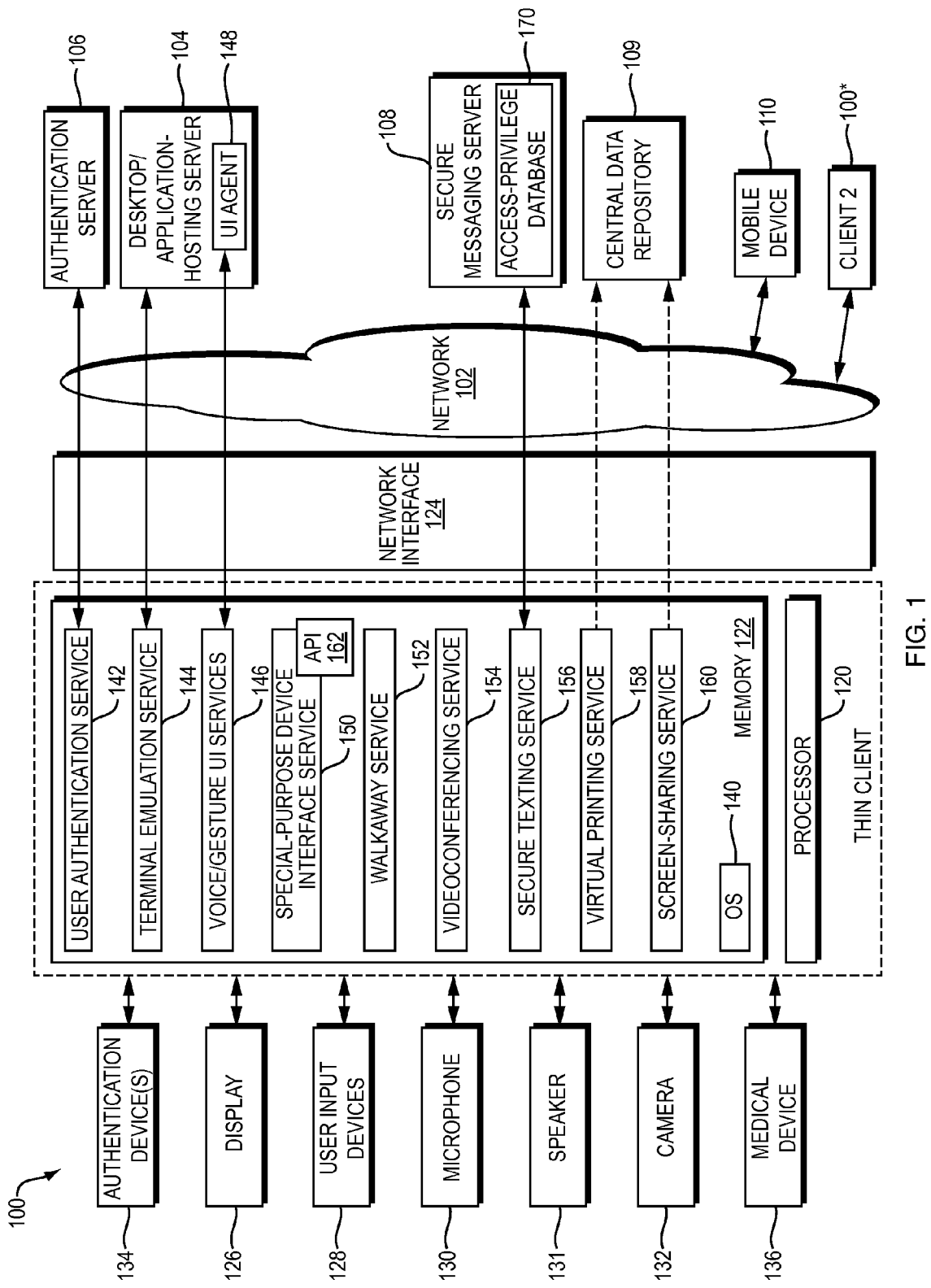
FIG. 1 is a block diagram illustrating an exemplary network system and thin client in accordance with various embodiments.

FIG. 1 illustrates an exemplary system for content-sharing among authorized network users. In the depicted embodiment, a workstation 100 is connected, via one or more networks 102, to an application/desktop-hosting server 104, an authentication server 106, a secure messaging server 108, optionally a central data repository 109 for shared content, as well as other workstations 100* and/or mobile devices 110. Different connections may be established via different networks. For example, in some embodiments, the application/desktop-hosting server 104, the authentication server 106, and a number of workstations 100 are all located on the same hospital campus and communicate via a (wired or wireless) local network (LAN or WLAN), using, e.g., Ethernet or Wi-Fi technology. Similarly, in a hospital system with facilities in multiple cities, communication between the different hospitals within the system may be established via a WAN. Further, to facilitate communication with users outside the hospital campus or system (such as, e.g., a clinician accessing the system from an off-site office), the servers 104, 106 and workstations 100 may be connected to the Internet. Communication with mobile devices 110 (on or off campus) may be enabled via a wireless network and the secure messaging server 108 (which may be on- or off-campus). In general, communications between the various servers and client devices may be established via any suitable type of network, including but not limited to those listed above.

The workstation 100 may (but need not) utilize a thin client device that includes a processor 120 and memory 122, and connected thereto a network interface 124, a display 126, traditional user input devices 128 (such as keyboard and mouse), optionally a microphone/speaker 130/131 and camera 132 for audio/video support, one or more authentication devices 134 (such as a proximity card reader, fingerprint reader, or radio-frequency identification (RFID) reader), and optionally one or more special-purpose devices 136 (such as medical devices measuring vital signs). The memory 122 stores an operating system 140 and, running on the operating system 140, several program modules or "services" for supporting the various functions described below and interfacing with the workstation hardware as well as, via the network interface 124 (such as, e.g., a modem or network adapter), with the servers and other client devices.

A user-authentication service (UAS) package 142 monitors input from the user-authentication device(s) 132, optionally in conjunction with user entry of traditional log-on credentials (via the input devices 128), and communicates with the authentication server 106 to validate the identity of the user. Authentication may be based on any combination of factors (including textual credentials such as user name, password, PINs, one-time password (OTP) tokens (e.g., as generated in conjunction with a serial number by a wireless device supporting near-field communications (NFC) or low-power BLUETOOTH; fingerprint, facial, or other biometrics; contact smartcards or contactless RFID proximity cards; and/or others) in accordance with a security policy, which may vary between users or classes of users and/or may be location-specific (e.g., such that a unit in a secured location may require less authentication than one in a public area). The UAS 142 manages the user-authentication workflow, which may involve, e.g., displaying the user interface dialog on the client device 100, listening for authentication-device events, setting up a secure connection with the authentication server 106, participating in processing the authentication data (e.g., fingerprint or facial biometrics) if necessary, and managing the authentication process. When the user is properly authenticated, the UAS 142 downloads the necessary user credentials, policies, and/or profiles to provide the correct run-time environment for the user.

Upon log-on of a user, the terminal emulation service (TES) 144 provides presentation and local device redirection to, and thus facilitates remote interaction with, hosted applications and/or complete desktops executing on the back-end server(s) 104. Commercially available terminal emulators 144 such as VMWARE VIEW, CITRIX RECEIVER or MICROSOFT RDP use different networking protocols (such as PCoIP, HDX, or RDX) to display graphical output from hosted applications and manage data transfer of user interface devices and locally connected USB devices to and from the hosted applications. In addition, web-based applications may be launched using a web browser such as MICROSOFT INTERNET EXPLORER, GOOGLE CHROME, or MOZILLA FIREFOX. The type of user session generated by the desktop/application-hosting server 144 may be dictated by the identity of the user, the particular role assigned to him, and/or the location of the client device 100, as driven by policy data (e.g., received from the authentication server 106). For example, the user's session (which determines the state of the applications accessed by the user) may be a completely new session or a continuation of a previous session started by the user on another workstation or a mobile device. In some embodiments, the session is "patient-aware" and tied to the location of the workstation; in this case, one or more applications may automatically launch and navigate to the same patient. In situations where a clinician utilizes a mobile device (e.g., a cell phone, tablet, or specialized medical device) in conjunction with the workstation, NFC can be used to communicate the patient's identity between the two devices, allowing the application to be synchronized so that the same patient's data is viewed on both the workstation and the mobile device. For example, a doctor may use a mobile phone to take a picture of a wound or skin rash, and then send the picture to an application on the workstation 100 either directly (via BLUETOOTH), or indirectly through a server that receives the image and then pushes it back to the application; the captured image may be tagged with the patient ID to ensure that the image remains properly associated with the patient.

The desktop/application server 106 may host one or more electronic medical records (EMR) application(s) that allow the clinician to retrieve, via the workstation 100, information regarding patients for whom he is responsible. The EMR applications may, for example, provide access to take-in forms populated by a nurse, clinical observations made by a physician, prescriptions issued to the patient, and/or the patient's lab results or medical-imaging data. Clinicians frequently base diagnoses and treatment recommendations on data from multiple sources and, therefore, simultaneously access multiple applications, which may be displayed in different windows. As described in greater detail below, embodiments hereof allow the clinician to share EMR data with other care providers, e.g., by transmitting the viewable contents to a collaborator via a text-messaging or other communication service.

The workstation 100 may facilitate enhanced, hands-free user interactions with local voice and/or gesture recognition using input from the microphone 128 and/or camera 130. Voice/gesture services (VGS) 146 on the thin client may convert microphone and camera input into user commands that can be sent directly to a user interface (UI) agent 148 running in the user's hosted session, i.e., on the hosting server 104. For example, audio input generated by a user speaking into the microphone 128 is processed locally by a conventional voice-services package (VSP) into commands executable by the UI agent. In some embodiments, speaker profiles stored on the user-authentication server 106 may be downloaded to the VSP (e.g., as part of or immediately following the authentication process) to adjust voice recognition to the particular user in terms of voice patterns, vocabulary, or other actionable criteria. User gestures captured by the camera 130 may, similarly, be processed locally by the thin client 100 and then sent to the UI agent 148, which converts them into mouse movements and actions as substitutes for traditional keyboard and/or mouse events.

The workstation 100 may also execute one or more applications locally. For example, in cases where the workstation 100 is connected to special-purpose device 136, such as a medical device acquiring patient data (e.g., an electrocardiogram (EKG) device, blood-pressure monitor, electronic stethoscope, etc.), a device interface 150 may import data from the device 136, format them for display, and/or facilitate user control of the device 136.

In some embodiments, the workstation 100 further stores a walk-away service (WAS) package 152, which monitors the workstation 100 for the presence or absence of the logged-in user and enforces the appropriate security policy to secure the device in the user's absence, e.g., by displaying a screen-saver that requires user re-authentication to unlock the workstation or by completely disconnecting the terminal-emulation session in use; the latter mode facilitates kiosk-like workflows in which multiple users share a workstation. Presence detection may be accomplished passively, e.g., by tracking user activity on interface devices (such as the keyboard, mouse, dictation microphone 130, or other USB devices) or by detecting proximity of a smartcard or RFID on the authentication device, or actively with, e.g., a real-time location system (such as the Ekahau system or Cisco/Aeroscout) or the camera 132 (see, e.g., copending U.S. patent application Ser. No. 12/547,100, filed on Aug. 25, 2009, the entire disclosure of which is hereby incorporated by reference). Software for processing the tracking data and events may run on the thin client device (e.g., as part of the WAS), or remotely on, for instance, the hosting server 104 or the authentication server 106.

The workstation 100 further includes various services that facilitate communication and data-sharing with other network users (e.g., other care providers, either within the same hospital or across hospital boundaries). A videoconferencing service (VCS) package 154 in conjunction with the camera 132 and microphone 131 may enable the user to communicate in real-time with another clinician or a patient. The VCS package 154 may include a camera control process that removes jitter, autofocuses the camera on the user, and/or centers the user within the camera's field of view (e.g., based on a face-tracking algorithm) to improve and/or optimize the teleconferencing experience. Conventional, specialized hardware and/or software may be used to compress and encrypt the stream of source images prior to transfer over the network to protect the patient's privacy (since the images may contain PHI, e.g., if the physician holds printed document up the screen or brings the patient within the camera's field of view during consultation with a colleague). To ensure the authenticity of the video at the recipient end, individual image frames may be time-stamped and/or watermarked or otherwise associated with the identity of the sending user, his work session, and/or the patient, e.g., in accordance with a policy implemented by the UAS 142. Watermarks may be visible embedded overlays on the images, or hidden embedded digital code that may be checked by a program on the recipient's device to guarantee the authenticity and integrity of the data stream (verifying, e.g., that the data has not been altered). These enhanced authentication capabilities also facilitate subsequent auditing and allow the video to be associated with patient records.

A secure texting service (STS) 156 may allow users to securely transmit not only text messages, but also messages containing or consisting of image, audio, video, and/or other data, to other workstations and/or mobile devices, enabling both synchronous (i.e., real-time) and asynchronous communications. Unauthorized interception, viewing, and/or manipulation of the message contents may be prevented with suitable encryption to ensure, e.g., patient privacy and HIPPA compliance. Security through encryption is generally provided at multiple levels—from in-memory representations at the sender's device, to in-flight data, to received data stored on the recipient's device. Further, the messages may be routed to the recipient via the secure messaging server 108, which may check the recipient's access privileges prior to transmission, as explained in more detail below. In some embodiments, the messaging server 108 forwards data included in the message from the sender's workstation 100 directly to the recipient device. In other embodiments, the data is stored in a central data repository 109, and a link to its location in the repository 109 is sent to the recipient device, as explained in more detail below.

Upon login of a user at the workstation 100, the STS 156 may map the login identity to the user's texting identity (e.g., using a look-up table stored on the authentication server 104 or the secure messaging server 108). Once the user's texting identity is established, the STS 156 may automatically check the secure messaging server 108 for pending inbound messages, and alert the user of their existence and status, e.g., by displaying a fixed or floating panel on the workstation display 124. The panel may be or include a dialog or chat window that enables the user to interact with the messages. When the user wants to send outbound messages, the STS 156 may communicate with the secure messaging server 108 to allow full directory lookup for other listed users; for instance, a clinician may look up a collaborator by name, or by category such as hospital, specialty-care provider, on-call provider, etc. Mapping between user's system-login and texting identities may facilitate an automatic determination of the client device the recipient is currently using (if any); thus, the messaging server 108 may route any messages to the appropriate workstation or mobile device or, if the user is off-line, store the message for later retrieval. With the STS 156 executing directly on the workstation 100, a mode of operation in which the user's session involves only the STS 156—rather than a complete desktop—is possible, eliminating computational overhead in circumstances where the user merely wants to communicate with other authorized users. Running the STS 156 on the workstation 100 rather than the hosting server 104 may also reduce the computing, memory, and networking load associated with secure messaging.

To conveniently share information accessed at the workstation 100, various methods may be employed to convert the information into one or more files suitable for transmission via, e.g., the STS 156. For example, a virtual printing service (VPS) package 158 may allow a care provider to "virtually print" a document opened in an application to any other STS-connected user. In some embodiments, when the STS 156 is enabled, a virtual print driver appears as a default local printer within the terminal emulator 144 and, when activated by the user, creates a printout stream in the manner of a conventional printer driver; the printout stream is converted to a compressed image (e.g., tiff or PDF) that can be sent to another client device via the secure messaging server 108. In some embodiments, the recipient is selected by the user prior to virtual printing (e.g., in a print dialog as a substitute for the destination file); the printout stream is then sent directly to the selected recipient. In other embodiments, individually printed documents from different applications may be temporarily stored in memory 122 on the sender's workstation 100, and then sent in the aggregate in a single message. To increase ease of use, a "print all" selection may automatically create virtual-print outputs from all applications opened in the terminal emulator 144 and (optionally) place them into a message ready for transmission, eliminating the need for the user to individually print and attach each document. Of course, numerous modifications and variations are possible. For instance, the user may select a subset of open applications for sharing, and then virtually print the selected documents with the push of a button.

Alternatively or additionally to the VPS 158, the workstation 100 may include a screen sharing service (SSS) 160, which allows any displayable content generated by the terminal emulator 144 to be shared. These displayable contents constitute the "last pane" between the terminal emulator 144 and the user, and may contain all the information necessary to collaborate with another user. The transmitting user may, for example, have several applications simultaneously running in different windows within the terminal emulator 144 and occupying different regions of the display—e.g., the user may view patient records via a secure database portal and lab results via a web page provided by an outside provider. To send this information to a colleague for consultation, the user may arrange the windows on the terminal emulator display (e.g., using a mouse or other pointing device on the client device 100) so that at least the critical data are simultaneously visible.

The SSS 160 may generate a screen replica, which may then be transmitted to another user, e.g., via the STS 156. For example, in embodiments where the workstation 100 is running a LINUX operating system, the actual graphical output generated by the terminal emulator 144 is converted into a displayable image by the X11/Server—the lowest-level interface with the workstation hardware. The SSS 160 may function as an extension to the X11/Server that intercepts the output generated by the terminal emulator 144. This "tee" into the display pipeline allows the SSS 160 to obtain a replica image and compress the image using, e.g., conventional image-compression software and/or hardware (e.g., MPEG). In one embodiment, the SSS 160 converts the entire display generated by the (hosted) desktop and application(s) into an image. In another embodiment, only a user-selected portion of the screen display is replicated for transmission to a selected collaborator. The user may, for instance, select a subset of the displayed windows for sharing, and the SSS 160 may extract, from the intercepted display output, portions corresponding to the positions of these windows. In some embodiments, the SSS 160 converts screen replica continuously, producing a video stream. Both static displayable images and video streams may transmitted to another user for display on a browser or, e.g., as an email attachment.

To support collaborative discussions, markup graphics and text may be overlaid on the shared content, allowing arbitrarily complex data that is either printable from the terminal emulator 144 or visible on the screen to be shared in a device-independent manner as a resizable image. Markup functionality may be provided by the terminal emulator 144 and/or the hosted desktop and applications, facilitating markup prior to generating the document or screen replica, or by the VPS 158 and SSS 160, enabling markup of the printed document or captured screen image. For example, the user may markup documents by highlighting text portions and/or image regions of interest or adding commentary; such functionality is standard, e.g., in various commercial software applications (e.g., ACROBAT READER), and can readily be implemented by those of skill in the art in virtual-printing and screen-sharing services in accordance herewith.

Furthermore, the VPS 158 and SSS 160 may enable adding graphic, audio, or video content to the screen/document replica. For example, a physician may orally (using the microphone 130) record his thoughts and questions regarding data displayed by an application, and associate the resulting audio file with the replica, e.g., in the form of a link. In this case, the screen replica is dynamic, i.e., it encodes content beyond the pixels of the replicated screen, or "active content" (e.g., an image sequence displayable as video, a still screen accompanied by audio, etc.). If a dynamic screen replica is rendered as a displayable browser object, a browser (or, more accurately, plug-ins running on the browser) can display the active content with full functionality, as it appeared on the screen of the transmitting device. Because links are recognized and rendered as such (rather than simply as pixels), the recipient can follow the links by clicking on or otherwise selecting them.

The VPS 158 and SSS 160 generally provide functionality for associating metadata with the screen/document replica to facilitate determining the recipient's access privileges, confirming the authenticity of the shared content, and/or documenting the shared information (e.g., for the purpose of subsequent audits). The metadata may identify the source of the information (e.g., the application(s) from which the replica is created or any databases from which data has been imported), the subject of the information (e.g., a particular patient), and/or the sending user's identity. Metadata may be stored, e.g., in the header of an image file, in a separate file sent along with the image file in the same message, or in some other form that links the metadata to the underlying replica image or video. The replica images may also be time-stamped and/or watermarked with the identity of the user for identification purposes in the event they are (physically) printed and/or archived as part of the patient's record.

In some embodiments, the workstation 100 further provides alternative means for exporting data from one or more applications that do not necessarily rely on a viewable data format. For example, data obtained by one or more medical devices 136 connected to the client device may be exported in binary form (or in some other format non-readable to humans) and transmitted to a destination user as such. At the recipient device, an interface surface 150 for the same kind of medical device may convert the binary data into a displayable format. Exporting data from an application in any format (whether viewable, such as HTML or pdf, or not) may be accomplished with a suitable application programming interface (API) 162 associated with the user-interface service 150 of the device, or using an open network protocol such as Health Level 7 (HL7), Continuing Care Record (CCR), Continuing Care Document (CCD) Like screen-display and document replica, any exported content may have identifying information (of the sender, the applications, the patient, etc.) associated with it, facilitating access-privilege checks prior to transmission to the destination user.

Figure 2A:
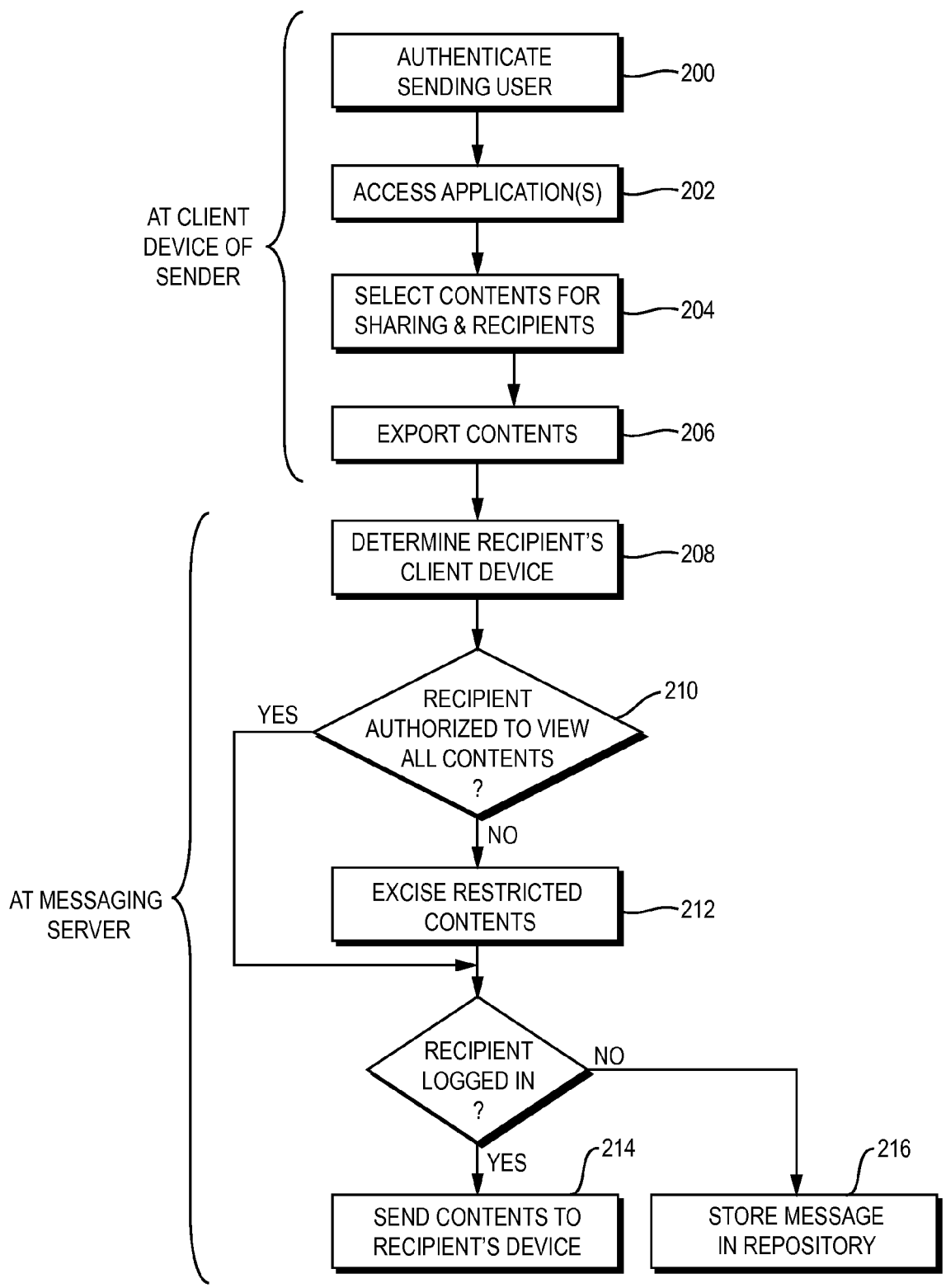
FIGS. 2A and 2B are flow charts illustrating authentication and content-sharing workflows in accordance with various embodiments.
Figure 2B:
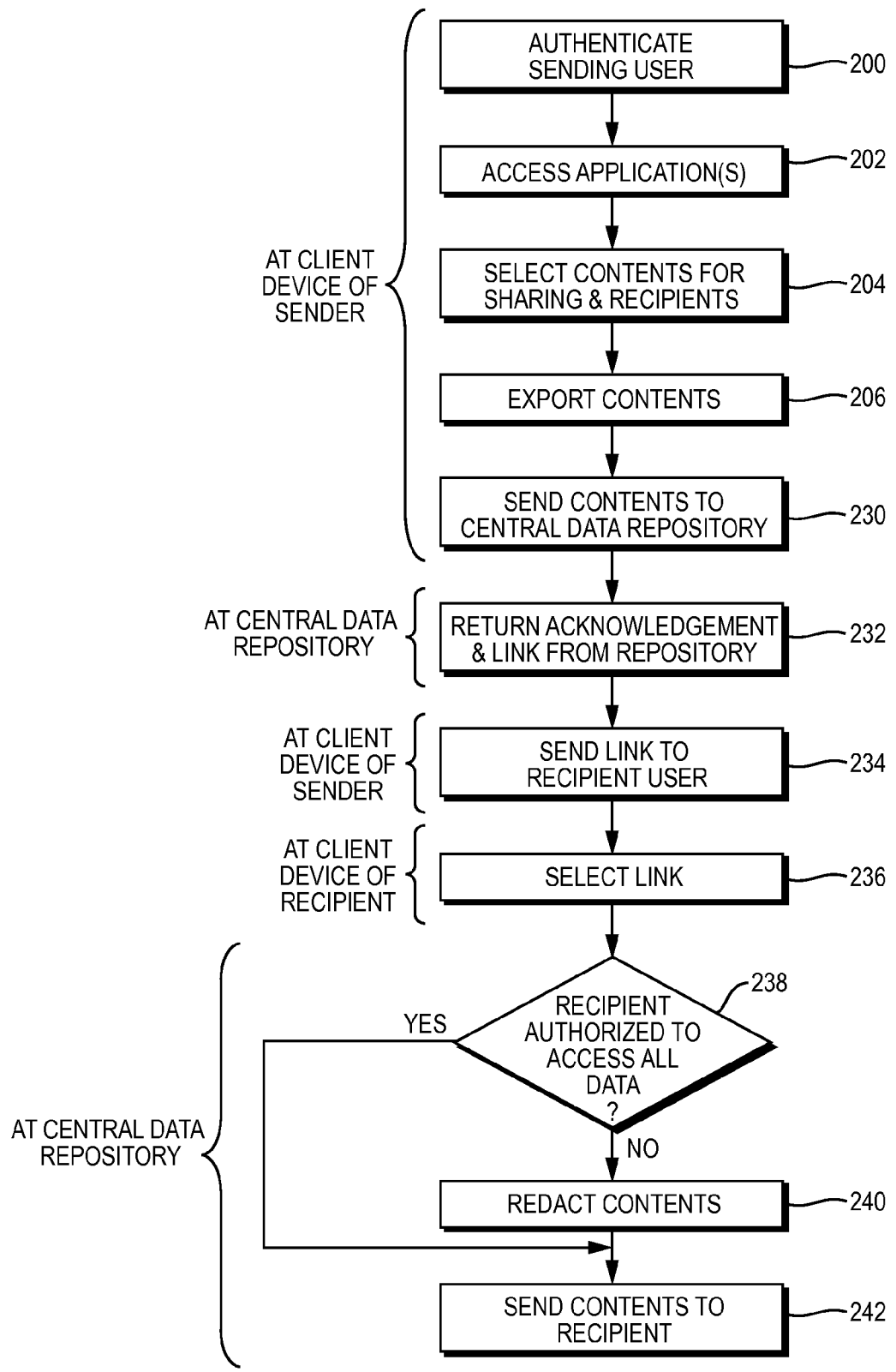

Exemplary workflows and authentication sequences for securely sharing information among authorized collaborators are illustrated in FIGS. 2A and 2B. Once a user has been authenticated by the authentication server 106 and has logged into the system (step 200), she may access one or more applications running either directly on the user's workstation 100 (or other client device) or at the remote hosting server 104 (step 202). To share content with collaborators, the user may designate one or more intended recipients and select the contents to be shared (e.g., the screen display or portions thereof, or a particular document) (step 204). The selected contents may be printed from the terminal emulator 144 (using VPS), extracted from its display output stream (using SSS), or otherwise exported (e.g., using an API) into a file suitable for transmission (step 206). This file may then be sent to the designated recipient (s), either by itself or as an attachment, e.g., to a text message.

As shown in FIG. 2A, the STS 156 may transmit the selected contents first to a messaging server 108 to determine for each recipient user (i) which client device that user is currently logged onto (if any) (step 208), and (ii) whether the user is authorized to view all of the information transmitted (step 210). The recipient user's access privileges—such as a list of the applications he is allowed to access or a list of patients he is responsible for—may be stored, e.g., in a database 170 on the messaging server 108, the authentication server 106, or both. The messaging server 108 may consult this database 170 to identify, based on the metadata sent along with the shared content, any portions that the recipient user is not permitted to access. Further, the messaging server 108 may excise any such restricted portions from the shared contents (step 212). For instance, if the designated recipient is not authorized to view data from a particular application (such as, e.g., a billing application storing patient financial account information), the messaging server 108 may black out the portion of a screen replica occupied by that application or delete a document virtually printed from that application. Thereafter, the redacted content is ready for transmission to the designated recipient. If the recipient user is presently logged into (and authenticated at) any client device, the messaging server forwards the message and/or shared content to that device (step 214). Otherwise, if the recipient user cannot presently be found, the messaging server stores the message and/or shared content in a message repository for retrieval at a later time (step 216).

In some embodiments, illustrated in FIG. 2B, the shared content is transmitted indirectly. The VPS 158, SSS 160, or other service generating the shared-content file may first send the file to a central data repository server 109 (step 230), which may return an acknowledgment as well as a link to the stored content (step 232) to the workstation 100. Via the STS 156, this link may then be sent to the designated user, e.g., in a text message (step 234). When the recipient receives and selects the link via a browser (step 236), the repository server 109 verifies that the recipient is properly authenticated and authorized to access all data contained in the shared file before actually transmitting the data (step 238). If necessary, the repository server redacts the shared content (step 240). Thereafter, the server 109 sends the shared content (e.g., a screen replica) to the requesting browser for display thereon as a web page (step 242).

The central data repository server 109 or, in the embodiment of FIG. 2A, the messaging server 108 may also sign the transmitted content (or portion thereof) with a digital signature associated with the sending user to authenticate the content as trustworthy and actually originating with the sending user. For example, in accordance with conventional principles of public-key cryptography, a signing algorithm can create a signature from a portion of the transmitted content and the sender's private key. A public key is sent to the receiving user along with the content. The receiving user's device executes a signature-verifying algorithm that, given the signature and the public key, verifies that the received content originated with the sending user and has not been altered in transit.

Various modifications of the two depicted workflows will be readily apparent to those of skill in the art. For instance, in some embodiments, the messaging server 108, upon receipt of a message with shared content from the workstation 100, stores the content in a central data repository server and automatically sends a message with a link to the stored content to the designated recipient(s). When a recipient clicks on the link to request the data, the central data repository server 109 may handle privilege-level checks and redaction as described above. Alternatively, the messaging server 108 may check the designated users' privilege level upon receipt of the message and either forward or store for later access a suitably redacted copy of the shared content for each of the designated users. The functionality of the messaging server 108 and the central data repository server 109 may, of course, be integrated on a single computer or distributed between more than two computers. Furthermore, some of the functionality may be executed on the authentication server 106.

In some embodiments, the server that transmits the shared content (e.g., the messaging server 108 or central data repository serer 109), or the sender's device, also assesses the display capability of the recipient device and optimizes the transmitted viewable content (e.g., screen replica) for rendering thereon, e.g., by resampling the image(s). This process is simplified if the recipient client device is registered with the server, in which case a server-accessible database record for the client device will include the type of device and, optionally, the identity of the recipient user logged onto the device (or, in the case of personal devices, the identity of the device owner). The database may also contain a field indicating whether the user has authenticated himself, and if not, rather than sending the shared content, the server may send a notification informing the user that content shared by a colleague is available and prompting him to provide his authentication tokens or credentials. The notification may be sent via email, text message, automated phone call, etc.—e.g., as specified by the user as a preference and stored as a field in the user's database record.

Figure 3:
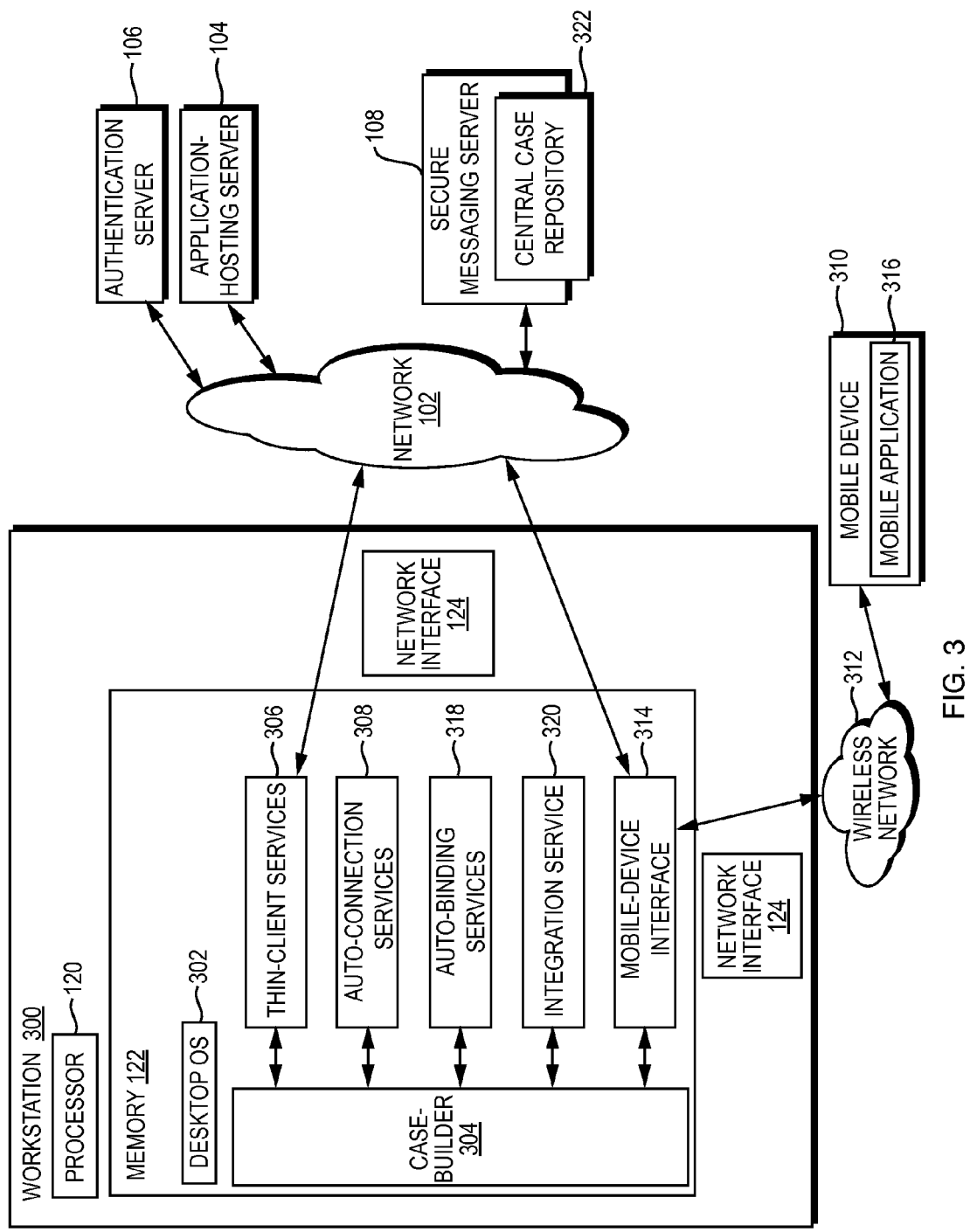
FIG. 3 is a block diagram illustrating a case builder application and associated services in accordance with various embodiments.

In some embodiments, enhanced capability for combining information from disparate sources into a single document is provided by a "case builder" application. The case builder application may run directly on a desktop client workstation (e.g., a conventional PC) connected, via the network 102, to the messaging server 108; a representative system architecture is shown in FIG. 3. Alternatively, the case builder may be executed on a remotely hosted desktop and accessed on the client device via TES 144. Either way, the case builder may support and/or control various services running on the client device, which may include those discussed above as well as additional services facilitating, e.g., enhanced workflow integration of mobile devices connected directly to the workstation.

The case builder is responsive to user selections and enables the user to integrate any viewable and displayable contents into a multimedia case file that can then be distributed to other users. In a clinical context, the contents may include, for example, historical data and newly acquired data (such as lab results and vitals) for the patient from multiple applications; new information (video, image, audio, physiological or other data) captured or stored on a paired mobile device (e.g., mobile EKG, a stethoscope or a pulse oximeter device); and annotation (text, graphics, voice, animation) provided by the clinician. The medium of distribution can be, for example, direct transport to another client device, or secure email/texting to an application or a generic browser session running on a desktop client or a mobile device. Receiving clinicians can view the case contents asynchronously on their desktop or mobile devices, add their own comments or clarifications, and reply directly with an opinion or answer. The conversation thread sorted by patient identifier (ID) (as provided, e.g., in metadata associated with the multimedia file) may become a record of critical decisions for the patient. If desired, all the captured video, images, audio, physiological, and conversational data may be packaged and integrated into an EMR system.

Referring to FIG. 3, the desktop workstation 300 may include a processor 120, memory 122, one or more network interfaces 124, and user interface and other hardware devices 126, 128, 130, 131, 132, 134, 138 as described above (not shown). Stored in memory 122 may be a desktop operating system 302 (or "desktop"), i.e., an operating system with associated desktop-style graphical user interface (such as MICROSOFT WINDOWS or MAC OS X). On the desktop 302, the workstation may run the case builder application 304 and various services controlled thereby. These services may include some or all of the services for user authentication, terminal emulation, screen sharing, virtual printing, etc. described above with respect to FIG. 1 (hereinafter collectively referred to as "thin-client services" 306). The workstation may be connected, via the network 102, to the authentication server 106, the application-hosting server 104, and the secure messaging server 108; the latter may be responsible for managing user access, policies, and audit records associated with the case builder application 304.

Besides the above-discussed thin-client services 306, the case builder system may support additional functions. An auto-connection service 308 may enable authorized users to connect their mobile devices 310 (e.g., cell phones or tablets used, e.g., to enter patient data) to the workstation 300, e.g., via a local wireless network 312, facilitating data transfer between the workstation 300 and the user's mobile device 310. For instance, when the clinician logs into the case builder application 304 (which may happen automatically when the user logs onto the workstation 300), the auto-connection service 308 may cause the desktop workstation 300 to connect to the clinician's mobile device 310 via WiFi, a cellular connection, BLUETOOTH, or another suitable wireless technology through, for example, push notification. The mobile-device interface module 314 of the case builder application 304 may have the ability to obtain, e.g., via communications with the messaging server 108, the identity of the clinician's mobile device 310 upon initial login at the workstation 300, and may connect to a complementary application 316 running on that mobile device 310. If a user has multiple mobile devices enrolled, the messaging server 108 may select a default mobile device 310. Thus, after the mobile device 310 has been authenticated to the case builder application 304 once, the mobile application 316 may be automatically connected and logged in each time the case builder application 304 is launched at the workstation 300; mutual trust between the mobile device 310 and the workstation 300 is established via transitive trust with the messaging server 108.

Following establishment of a connection between the workstation 300 and the mobile device 310 and activation of the mobile application 316, contents captured and/or stored on the mobile device 310 may be sent automatically, without any additional action by the user, to the workstation 300 for integration into the case file managed by the case builder application 304. Communications between the mobile device and the desktop device may be secured through use of Transport Layer Security (TLS) and/or Secure Sockets Layer (SSL) technology (or other cryptographic protocols). Once the mobile device 310 is trusted by the case builder application 304, the clinician has full access, via the case builder application 304, to the camera, microphone, and any other peripherals (e.g., BLUETOOTH, NFC, or local storage) associated with the mobile device 310.

The workstation 300 may also provide an auto-binding service 318 that makes the mobile device 310 a seamless extension to the workstation 300 running the case builder 304. To create a new case or continue working on an existing case, the clinician may enter the patient's demographics and/or Medical Record Number (MRN) into the case builder application 304, which may maintain a list of recently selected MRNs to reduce the need to re-type. After an MRN is entered, the case builder 304 notifies the mobile application 316 of the patient ID associated with the accessed medical record. The mobile application 316, thereafter, binds the patient ID to any data sent from the mobile device 310 to the workstation 300. This ensures that any content, such as image, video, audio, or other data, captured by the mobile device 310 is properly tagged with the patient ID, automatically uploaded, via the wireless network 312, to the case builder 304 with the patient's ID, and routed into the patient's case file. The auto-binding process may, alternatively, initiate directly from the mobile application. The patient ID is retained on the mobile device 310 until the case is closed by the clinician. In some embodiments, the mobile application 316 deletes all data from the mobile device following successful importation into the case file so that nothing persists on the mobile device 310.

The data captured by the mobile device 310 and from applications running on the workstation 300 may be integrated into a single structured case file—typically a multimedia document—by an integration service 320 that receives user input via the case builder 304. The clinician may, for instance, assemble screen-captured content, electronically printed content, and imported mobile content into a document structure that maintains the hierarchical nature of the information. Clinicians are used to communicating essential patient information among each other in the form of so-called SOAP ("subjective, objective, assessment, and plan") notes: the subjective element describes the nature of the patient's complaint or the reason for the visit or hospitalization; the objective element captures the vital signs, lab results, and findings of medical examinations (e.g., of cardiac or respiratory systems); the assessment summarizes possible diagnoses of the patient's medical condition; and the plan defines the healthcare provider's recommended treatment. To accommodate communications within the SOAP framework, the case builder 304 may tag each item of information within the case file with the SOAP element it belongs to.

To select content for inclusion into the case file, the clinician can, in some embodiments, bring a selected application into foreground focus and capture the resulting screen display using a hotkey, a right-click context menu, or an optional camera icon embedded in the title bar of the application. Following screen capture, overlay text or graphics may be used to annotate the image or video. Supplementing a VPS package 158 that may be run on the workstation 300, the case builder 304 may capture screen content by hooking into an individual application and having the application "paint" into a memory canvas, or by directly obtaining the display bitmap associated with the application; this way, content may be captured, e.g., in the form of a postscript file or as screen content represented in a lossless fashion using the Remote Buffer Protocol (RBP). Further, in some embodiments, both printable and screen content may be converted into a structured (e.g., hyperlinked) and/or searchable document based on the text recognition and/or extraction of textual data. Screen data or a printable documents that have been run through an Optical Character Reader (OCR), for instance, may be queried to detect keywords such as patient demographics, lab results, etc. Key patient data obtained in this manner may be used, e.g., to generate structured data suitable for access by and/or conforming to other applications (such as certain EMR applications).

In some embodiment, voice annotation and/or dictation may be inserted into the case file, e.g., using either a microphone associated with the workstation or a recording functionality of the mobile device 310 (as is typically provided with mobile phones). Like any other data obtained from the mobile device 310, voice recordings are transferred automatically to the case file using the associated patient ID. Alternatively or additionally to attaching voice recordings, speech or text conversion capabilities on the mobile device 310 may be used to convert recorded speech into text strings for inclusion into the case.

In addition to capturing screen and printable content, the case builder 304 may also be able to obtain structured data directly from the applications; the applications may output raw data that may be converted into, e.g., a tagged extensible markup language (XML) representation suitable for decoding by a viewing application such as a web browser. Using this capability, data from, for example, physiological or biomedical devices worn by the patient can be obtained and easily and accurately entered into the case file.

After the clinician has assembled the structured case file, the document may be digitally encrypted, electronically signed, time-stamped, and/or watermarked with the identity of the user or the certificate associated with the hospital, and then sent to the messaging server 108 for distribution to designated recipients. The case builder application 304 may retrieve a list of contacts (which may include phone and/or texting numbers, email addresses, etc.) from the messaging server 108 to allow the clinician to select who receives the case, thereby manually restricting distribution to authorized personnel. In addition, the messaging server 108 (and/or the sender's workstation) may excise, for each recipient, any document portions that the recipient is not entitled to access; access restrictions may be determined, e.g., based on the MRN, patient ID, or metadata identifying the source of the information in conjunction with a database of user access privileges stored on the authentication server, as described above.

The case file may be forwarded to the recipients in the form of an attachment to a text message or email, for example. Alternatively, a recipient may receive access to the case file via a link included with an alert sent, e.g., to her mobile device or to a web browser or proprietary application running on a workstation. Clicking on the link may trigger download and/or display of the document from a central case repository 322 maintained by the messaging server. In some embodiments, the information in a patient's case file may be organized and displayed by SOAP components. Centralized storage and distribution of the document allows the system to track the time of access by each recipient, e.g., in a case access log associated with the central case repository. In addition, in some embodiments, user-input events occurring at the recipient's end when the case file is viewed may be communicated back to the messaging server and included in the case file as additional content, annotations, or reply messages—potentially resulting in a graph of discussion threads fanning out from the original case. The messaging server 108 may assemble all threaded lists of conversations for a given patient ID into a single "hypercase" document and generate a globally unique ID therefor. The hypercase document may be stored on the case repository 322, or digitally signed and exported to, e.g., an EMR application to archive it as part of the patient history.

The case builder, various client services, and other applications described above are generally implemented by computer-executable (software or firmware) instructions, typically organized into program modules (including, e.g., routines, programs, objects, components, data structures, etc. that perform particular tasks or implement particular abstract data types), that are executed by a conventional computer processor. The computer-executable instructions may be programmed in any suitable programming language, including, without limitation, assembly language, Ada, APL, Basic, C, C++, C*, COBOL, dBase, Forth, FORTRAN, JAVA, Modula-2, Pascal, Prolog, Python, RUM and/or JAVASCRIPT. It is not necessary that a single type of instruction or programming language be utilized in conjunction with the operation of the system and method of the invention. Rather, any number of different programming languages may be utilized as is necessary or desirable.

The processing units that execute the various commands and instructions may be general-purpose processors, but may also utilize any of a wide variety of other technologies, including special-purpose hardware, a microcomputer, minicomputer, mainframe computer, programmed microprocessor, microcontroller, peripheral integrated circuit element, a customer-specific integrated circuit (CSIC), application-specific integrated circuit (ASIC), a logic circuit, a digital signal processor (DSP), a programmable logic device (PLD) such as a field-programmable gate array (FPGA) or programmable logic array (PLA), and RFID processor, smart chip, or any other device or arrangement of devices that is capable of implementing the steps of the processes of the invention.

The servers and client devices may, in addition to system memory, also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used include, but are not limited to, magnetic tape cassettes, flash memory cards, digital versatile disks, digital video tape, solid state RAM, solid state ROM, and the like. The storage media are typically connected to the processor and system memory via a system bus.

Those skilled in the art will appreciate that the various servers may be implemented with various computer system configurations, e.g., as multiprocessor systems, microprocessor-based or programmable consumer electronics, minicomputers, mainframe computers, and the like. The server(s) may also be implemented in distributed computing environments where tasks are performed by remote processing nodes linked through a communications network. In a distributed computing environment, program modules may be located in both local and remote computer-storage media.

The client devices generally communicate with the server(s) via a computer or telecommunications network. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter. When used in a WAN networking environment, computers typically include a modem or other communication mechanism. Networked computers may be connected over the Internet, an intranet, extranet, or, generally, any system that provides communications. Some suitable communications protocols include TCP/IP, UDP, or OSI, for example. Suitable protocols for wireless communications include, e.g., IEEE 802.11x ("Wi-Fi"), BLUETOOTH, Zigbee, and/or IrDa. Furthermore, components of the system may communicate through a combination of wired or wireless paths, and communication may involve both computer and telecommunications networks. For example, a user may establish communication with an authentication server using a "smart phone" via a cellular carrier's network and authenticate by voice recognition over a voice channel; alternatively, she may use the same smart phone to authenticate to the same server via the Internet, using TCP/IP over the carrier's switch network, or via Wi-Fi and a computer network connected to the Internet.

Although the invention has been described herein with respect to specific embodiments and details, various modifications, alternative embodiments, and different combinations of features that still solve the problems addressed by the invention in a similar manner will be readily apparent to a person of skill in the art, and are understood to be within the scope of the invention. For example, the overall functionality provided on the client devices as described above in the form of discrete services or service packages—may be grouped, organized, and distributed between various program modules in many different ways. Further, the (authentication, secure-messaging, hosting, etc.) functionality of the various servers may be distributed differently among these and/or fewer or other servers, and some functionality may be provided on the client devices rather than on servers. Thus, the embodiments described herein are merely illustrative and not restrictive.

What is claimed is:

1. A method of sharing accessed content between authorized users within a network-managed user group, the method comprising the steps of:
   at a first user device,
      a. authenticating a first user via communication with an authentication server;
      b. providing access to multiple software applications;
      c. by the first user using the first user device, selecting a second user and a third user within the user group, wherein the second and third users have different access privileges permitting access to contents from the multiple software applications;
      d. by the first user using the first user device, selecting contents from the multiple accessed software applications, thereby defining a set of contents for transmission to both the second user and the third user;
      e. exporting the set of contents and transmitting the exported set of contents to a server; and
   at the server,
      f. combining only portions of the set of contents to which the access privileges of the second user permit access into a first compilation;
      g. combining only portions of the set of contents to which the access privileges of the third user permit access into a second compilation, wherein the first and second compilations include different portions of the set of contents;
      h. associating a digital signature identifying the first user with the first compilation;
      i. determining whether the second user has been authenticated by the authentication server via a second user device, and if so, causing transmission of only the first compilation to the second user device, the digital signature being verified at the second device; and
      j. determining whether the third user has been authenticated by the authentication server via a third user device, and if so, causing transmission of only the second compilation to the third user device.

2. The method of claim 1, wherein exporting the set of contents comprises converting at least a portion of a screen display into an image file.

3. The method of claim 1, wherein exporting the set of contents comprises virtually printing contents of selected ones of the multiple software applications.

4. The method of claim 1, further comprising integrating the exported set of contents into a multi-media case file prior to transmission to the server.

5. The method of claim 1, further comprising annotating the exported set of contents prior to transmission to the server.

6. The method of claim 1, wherein combining only portions of the set of contents to which the access privileges of the second user permit access into the first compilation comprises redacting the exported set of contents by excising therefrom, by the server, portions to which the second user does not have access privileges.

7. The method of claim 1, wherein causing transmission of only the first compilation to the second user device comprises sending a message containing the first compilation to the second user device.

8. The method of claim 1, wherein causing transmission of only the first compilation to the second user device comprises (i) storing the first compilation in a central repository, (ii) causing transmission of a link to the stored first compilation to the second user device, and (iii) upon execution of the link at the second user device, transmitting the stored first compilation to the second user device.

9. The method of claim 1, wherein exporting the set of contents comprises associating metadata therewith, the metadata identifying at least one of the first user, the software applications from which the set of contents is selected, or a subject to which the set of contents pertains.

10. The method of claim 9, wherein the software applications provide access to electronic medical records, the subject to which the set of contents pertains comprising a patient identifier.

11. The method of claim 9, wherein combining only portions of the set of contents to which the access privileges of the second user permit access into the first compilation is performed based at least in part on the metadata.

12. The method of claim 1, wherein combining only portions of the set of contents to which the access privileges of the second user permit access into the first compilation comprises consulting a database of user access privileges.

13. The method of claim 1, wherein the software applications are executed on a remote hosting server, access to the software applications being provided by executing, on the first user device, a terminal emulator service displaying output from the software applications received via a network connection with the hosting server.

14. The method of claim 1, wherein the first, second, and third users are authenticated via authentication devices associated with the first, second, and third user devices.

15. The method of claim 14, wherein the authentication devices obtain data from the first, second, and third users, authenticating the first, second, and third users comprising transmitting the data to an authentication server, comparing the received data at the authentication server to stored data for each of the first, second, and third users and, upon detection of a match between the received and stored data, declaring the first, second, and third users authenticated.

16. The method of claim 1, wherein selecting contents from the multiple accessed software applications comprises selecting display contents comprising multiple display portions containing data from different ones of the accessed software applications.

17. The method of claim 1, wherein selecting contents from the multiple accessed software applications comprises selecting, among the accessed software applications, applications for transmission of their contents.

18. The method of claim 1, further comprising, if the second user has not been authenticated by the authentication server via the second user device, facilitating authentication of the second user to the authentication server, and upon successful authentication of the second user, causing transmission of only the first compilation to the second user device.

19. The method of claim 1, wherein the exported set of contents is static.

20. The method of claim 1, wherein the exported set of contents is dynamic.

21. The method of claim 20, wherein the exported set of contents comprises at least one of a selectable web link, an image sequence displayable as video, or audio content.

22. A client device providing access to multiple software applications and facilitating sharing of contents thereof with authorized users within a network-managed user group, the client device comprising:
a network interface;
a processor; and
memory storing processor-executable instructions comprising:
  a. a user-authentication service which, when executed by the processor, establishes communications with an authentication server via the network interface to authenticate a user of the client device;
  b. access means which, when executed by the processor, provide access to multiple software applications;
  c. export means, responsive to selection by the user of contents from the software applications to define a set of contents, which, when executed by the processor, export the set of contents from the software applications and associate metadata therewith; and
  d. a secure messaging service, responsive to designation by the user of second and third recipient users, which, when executed by the processor, transmits the exported set of contents and associated metadata to a server for (i) determination, based at least in part on the metadata, whether the designated second and third recipient users have access privileges permitting access to at least a portion of the exported set of contents, (ii) combining only portions of the set of contents to which the access privileges of the second recipient user permit access into a first compilation, (iii) combining only portions of the set of contents to which the access privileges of the third recipient user permit access into a second compilation, wherein the first and second compilations include different portions of the set of contents, (iv) associating a digital signature identifying the user with the first compilation, (v) transmission of only the first compilation to a second recipient client device used by the second recipient user, the digital signature being verified at the second recipient client device, and (vi) transmission of only the second compilation to a third recipient client device used by the third recipient user.

23. The client device of claim 22, wherein the access means comprise at least one of (i) the software applications, or (ii) a terminal emulation service connected, via the network interface, with a remote hosting server executing the software applications, the terminal emulation service, when executed by the processor, causing display of output from the remotely executed applications on the client computer.

24. The client device of claim 22, wherein the export means comprise at least one of a screen-sharing service and a virtual-printing service.

25. The client device of claim 22, wherein the metadata identifies at least one of the user, the software applications from which the set of contents are selected, or a subject to which the set of contents pertains.

26. The client device of claim 22, wherein the processor-executable instructions further comprise a case builder application facilitating integration of content from multiple sources into a single case file.

27. The client device of claim 26, wherein the processor-executable instructions further comprise an auto-connection service which, when executed by the processor, automatically connects the client device to a mobile device belonging to the user authenticated at the client device.

28. The client device of claim 27, wherein the processor-executable instructions further comprise an auto-binding service which, when executed by the processor and following connection of the client device to the mobile device, sends an identifier associated with the case file to the mobile device and causes the mobile device to tag data transmitted therefrom to the client device with the identifier.

29. The client device of claim 26, further comprising an authentication device, authentication of the user being based, at least in part, on data obtained by the authentication device.

\* \* \* \* \*